(12) United States Patent
Osara et al.

(10) Patent No.: US 8,869,923 B2
(45) Date of Patent: Oct. 28, 2014

(54) ROCK DRILLING RIG AND METHOD FOR DOWNHILL DRIVE

(75) Inventors: Jukka Osara, Tampere (FI); Juha Piipponen, Tampere (FI); Jarno Kuittinen, Tampere (FI); Timo Niemi, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 149 days.

(21) Appl. No.: 13/698,321

(22) PCT Filed: May 24, 2011

(86) PCT No.: PCT/FI2011/050469
§ 371 (c)(1),
(2), (4) Date: Nov. 16, 2012

(87) PCT Pub. No.: WO2011/148051
PCT Pub. Date: Dec. 1, 2011

(65) Prior Publication Data
US 2013/0056279 A1 Mar. 7, 2013

(30) Foreign Application Priority Data
May 25, 2010 (FI) .................................... 20105578

(51) Int. Cl.
| | |
|---|---|
| *B60L 7/10* | (2006.01) |
| *B60W 30/18* | (2012.01) |
| *E21B 7/02* | (2006.01) |
| *B60L 11/12* | (2006.01) |
| *B60T 13/58* | (2006.01) |
| *B60L 11/18* | (2006.01) |
| *B60L 1/00* | (2006.01) |
| *B60K 6/00* | (2006.01) |
| *B60W 20/00* | (2006.01) |

(52) U.S. Cl.
CPC ... *B60K 6/00* (2013.01); *B06L 7/06* (2013.01); *B60W 30/18127* (2013.01); *Y02T 10/70* (2013.01); *E21B 7/022* (2013.01); *B60L 11/123* (2013.01); *B60T 13/586* (2013.01); *Y02T 10/6217* (2013.01); *Y02T 10/7077* (2013.01); *B60W 2300/17* (2013.01); *B60L 11/1803* (2013.01); *B60L 2220/44* (2013.01); *B60L 2240/36* (2013.01); *Y02T 10/6208* (2013.01); *B60W 20/00* (2013.01); *B60L 1/003* (2013.01); *B60L 11/126* (2013.01); *E21B 7/024* (2013.01); *Y02T 10/7005* (2013.01); *B60L 2260/28* (2013.01)
USPC .................................................. 180/65.1

(58) Field of Classification Search
CPC ........... E21B 7/02; E21B 7/022; E21B 7/025; B60L 7/10; B60L 7/18
USPC ............................................ 180/65.1; 701/22
See application file for complete search history.

(56) References Cited

U.S. PATENT DOCUMENTS
| | | | | |
|---|---|---|---|---|
| 6,318,487 B2 * | 11/2001 | Yanase et al. | ............ | 180/65.245 |
| 6,989,644 B2 * | 1/2006 | Kim | ......................... | 318/400.31 |
| 7,657,350 B2 * | 2/2010 | Moran | ............................ | 701/22 |

(Continued)

FOREIGN PATENT DOCUMENTS
| | | |
|---|---|---|
| DE | 102008001900 A1 | 11/2009 |
| EP | 2135838 A1 | 11/2009 |
| WO | 2005118329 A1 | 12/2005 |

*Primary Examiner* — Katy M Ebner
(74) *Attorney, Agent, or Firm* — Corinne R. Gorski

(57) ABSTRACT

The invention relates to a rock drilling rig and a method for downhill driving of a rock drilling rig. The rock drilling rig comprises electric drive equipment, the drive motor of which serves as a primary brake in long-term downhill driving. The drive motor thus converts kinetic energy into electric energy, with which an energy storage is charged. To consume surplus electric energy, a hydraulic system or a compressed air system is turned on. A hydraulic pump and a compressor (54) are driven by an electric motor.

15 Claims, 3 Drawing Sheets

(56) References Cited

U.S. PATENT DOCUMENTS

| | | | |
|---|---|---|---|
| 7,717,193 B2 * | 5/2010 | Egilsson et al. | 175/24 |
| 7,848,857 B2 * | 12/2010 | Nasr et al. | 701/22 |
| 7,923,951 B2 * | 4/2011 | Soma et al. | 318/376 |
| 2005/0005814 A1 * | 1/2005 | Kumar et al. | 105/35 |
| 2010/0186404 A1 * | 7/2010 | Yasufuku et al. | 60/459 |
| 2012/0191278 A1 * | 7/2012 | Wippler | 701/22 |

* cited by examiner

ROCK DRILLING RIG AND METHOD FOR DOWNHILL DRIVE

RELATED APPLICATION DATA

This application is a §371 National Stage Application of PCT International Application No. PCT/FI2011/050469 filed May 24, 2011 claiming priority of Finnish Application No. 20105578, filed May 25, 2010.

BACKGROUND OF THE INVENTION

The invention relates to a rock drilling rig comprising a boom provided with a rock drilling machine, as well as a pressure medium system having actuators connected to it. The rock drilling rig is moved by means of combustion-engine-free drive equipment comprising at least one electric drive motor, as well as power transmission members between the drive motor and the traction wheel. In transfer drive, electric energy to be used may be charged in an energy storage included in the electric system. The drive motor serves as a generator and a primary brake in long-term downhill driving, and generated electric energy is controlled to charge the electric storage.

Further, the invention relates to a method for downhill driving of a rock drilling rig.

The field of the invention is described in more detail in the preambles of the independent claims of the application.

In mines, rock drilling rigs are used to drill boreholes at planned drilling sites. When the boreholes have been drilled, the rock drilling rig is transferred to the next drilling site for drilling a new drilling fan or face. In particular, in underground mines it is advantageous to perform the transfer drive by means of power generated by an electric motor. The energy required by the transfer drive may be stored in a battery. In mines, there is also frequently a need to drive the rock drilling rig along drive ramps sloping downwards. In large mines, downhill driving may even take a very long time. For the duration of downhill driving, the electric drive motor is connected to serve as a generator, the electricity generated by this generator being used to charge the battery. However, during long-term downhill driving, such a large amount of electric energy is generated that not all of it can be used for charging batteries. Thus, the electric system of the rock drilling rig has a limited capability to control the generated electric energy, which may make efficient downhill driving more difficult.

BRIEF DESCRIPTION OF THE INVENTION

The object of the present invention is to provide a novel and improved rock drilling rig and a method for downhill driving of a rock drilling rig.

The rock drilling rig according to the invention is characterized in that the control unit comprises a control strategy according to which it turns at least one pressure medium system on in response to the electric system being insufficient to consume the surplus electric energy generated in the downhill driving, whereby the electric energy consumption can be intentionally increased by means of the pressure medium system.

The method according to the invention is characterized by converting electric energy generated during the downhill driving into pressure energy in response to a need to consume surplus energy.

The idea is that the rock drilling rig is decelerated in downhill driving by means of an electric drive motor that is connected to serve as a generator. Hereby, the kinetic energy of the rock drilling rig is converted into electric energy with which the energy storage is charged. The surplus electric energy which cannot be stored in the energy storage is used for driving the pressure medium system. Thus, some of the electric energy generated during deceleration is converted into pressure energy.

An advantage is that the electric energy consumption of the rock drilling rig can be intentionally increased by starting the pressure medium system. Then, the driving speed of downhill driving can be kept sufficiently high, whereby the efficiency of the rig is good.

The idea of an embodiment is that the control unit comprises a control strategy according to which the control unit controls the speed of downhill driving, taking into account the capability of the systems to consume the electric energy generated in deceleration. In a situation where the electric system cannot receive or use any larger amount of electric energy supplied to it, the control system begins to restrict the speed of the downhill driving of the rock drilling rig. When the vehicle is driven downhill at a very low speed, less electric energy is generated in the drive motor.

The idea of an embodiment is that the driving speed of the rock drilling rig is maximized in downhill driving, taking into account the systems' greatest electricity consumption that is aimed at.

The idea of an embodiment is that the requirement for pressure energy is increased during downhill driving to increase energy consumption.

The idea of an embodiment is that the rock drilling rig comprises a drilling hydraulic system that is turned on by the control unit during downhill driving so that surplus electric energy can be consumed. The control unit may comprise a control strategy to implement this operation. Further, it is feasible to turn on one or more hydraulic actuators included in the drilling hydraulic system during downhill driving, whereby the requirement for hydraulic power increases. The hydraulic actuator may be, for example, a percussion device, a rotation device, a feed device, a boom cylinder or another actuator affecting the drilling. An advantage of this application is that the electric energy consumption can be increased by means of the existing system and components of the rock drilling rig.

The idea of an embodiment is that the pressure medium system is provided with at least one hydraulic component which can be turned on for the duration of downhill driving so that the energy consumption of the pressure medium system can be increased. The control unit may comprise a control strategy to implement this operation. This application provides a rather simple and efficient way to increase the pressure energy consumption. By means of the component, pressure energy can be converted into heat.

The idea of an embodiment is that the rock drilling rig comprises at least one compressed air system which is turned on by the control unit during downhill driving. The control unit may comprise a control strategy to implement this operation. Owing to this application, surplus electric energy can be used for operating one or more compressors. Generated compressed air can be used for operating an actuator during downhill driving. Further, it is feasible to cool one of the components or systems of the rock drilling rig by means of compressed air during downhill driving.

The idea of an embodiment is that pressure medium produced by the pressure medium system is controlled, during downhill driving, to cool at least one electric component included in the electric system. The hydraulic system, compressed air system or both systems of the rock drilling rig may be arranged to provide pressure medium for cooling. Owing to the cooling, the load of the components included in the electric system can be increased. Further, it is feasible to use generated pressure fluid and compressed air for cooling the ordinary operating brakes of the rock drilling rig.

The idea of an embodiment is that the rock drilling rig comprises a liquid cooling system for cooling one or more electric components included in the electric system. The control unit can turn the liquid cooling system on for downhill driving. Owing to the liquid cooling system, the load of the components included in the electric system can be increased.

The idea of an embodiment is that the rock drilling rig comprises a liquid cooling system with which components of the electric system can be cooled. Further, the pressure medium system is arranged to cool the cooling liquid of the liquid cooling system during downhill driving.

The idea of an embodiment is that the control unit controls one or more actuators connected to the pressure medium system to be turned on during downhill driving. The actuator in question is turned on to increase the energy consumption on purpose even if there were no need for normal operation of the actuator.

The idea of an embodiment is that the electric system comprises at least one electric brake resistor which can be provided with surplus electric energy generated in downhill driving. Thus, surplus electric energy remaining after charging the energy storage can be converted into heat in the brake resistor. A brake resistor is a rather simple way to increase the consumption of electricity in the system. A further advantage of a brake resistor is its good load capacity.

The idea of an embodiment is that the electric system comprises one or more brake resistors which can be momentarily overloaded during downhill driving, compared with its rated load. The control unit or load monitoring in it may be provided with a control strategy allowing said overloading. This application improves the dynamics of the system.

The idea of an embodiment is that pressure energy generated is stored in one or more pressure accumulators. This stored pressure energy may be later utilized in moving the carrier or in operating a pressure-medium-driven actuator. Pressure accumulators allow the energy efficiency of the rig to be improved.

BRIEF DESCRIPTION OF THE FIGURES

Some embodiments of the invention will be explained in greater detail in the attached drawings, in which.

In the figures, some embodiments are shown in a simplified manner for the sake of clarity. Similar parts are denoted with the same reference numerals in the figures.

DETAILED DESCRIPTION OF SOME EMBODIMENTS

Figure 1:
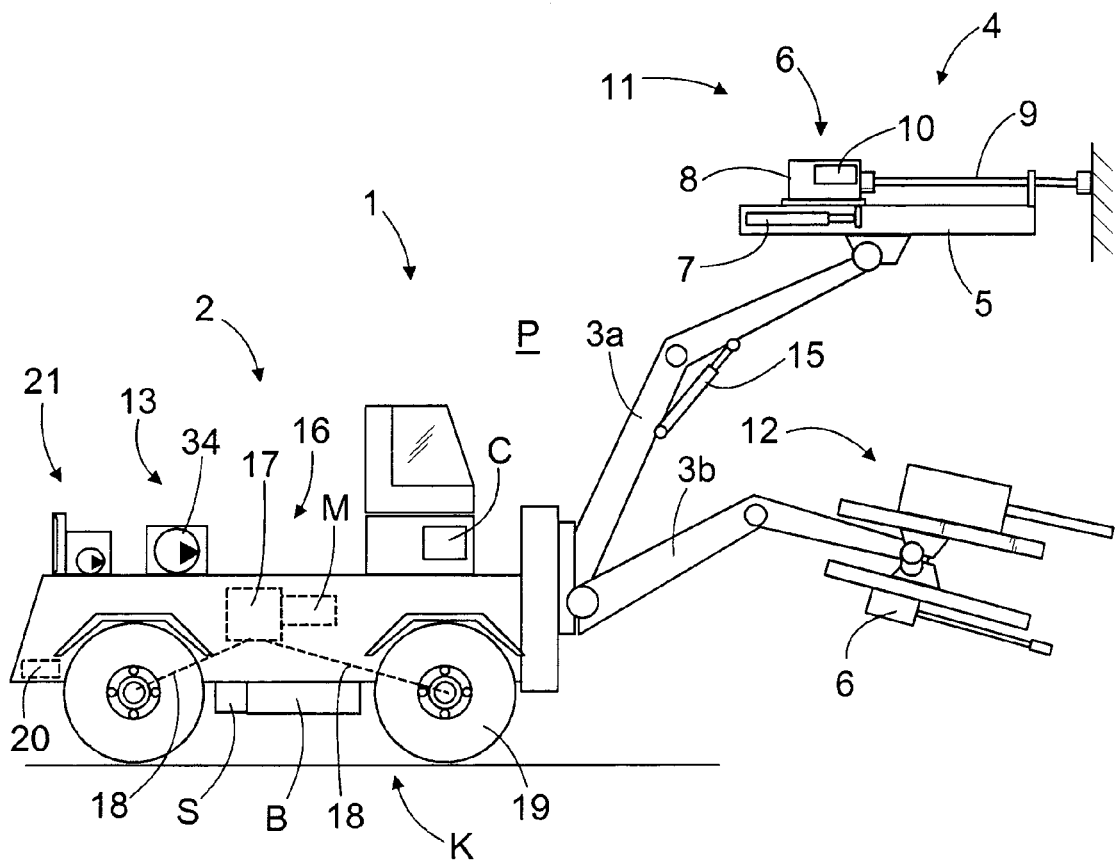
FIG. 1 is a schematic side view of a rock drilling rig driven to a drilling site.

FIG. 1 shows a feasible rock drilling rig 1 comprising a movable carrier 2 which is provided with one or more booms 3a, 3b equipped with a drilling unit 4. The drilling unit 4 may comprise a feed beam 5 provided with a rock drilling machine 6 that can be moved on the feed beam 5 by means of a feed device 7. The rock drilling machine 6 may comprise a percussion device 8 for generating impact pulses on a tool 9, and a rotating device 10 for rotating the tool 9. Further, it may include a flushing device. The boom 3a shown in the figure and the drilling unit 4 arranged therein are intended for drilling boreholes in a face 11 of a tunnel or a corresponding drilling site. Alternatively, the boom and the drilling unit thereon may be designed for drilling fan-like boreholes in a ceiling and walls of a rock cavity. Further, the rock drilling rig 1 may comprise a boom 3b provided with a bolting device 12, which also comprises a rock drilling machine 6. The rock drilling rig 1 may comprise one or more hydraulic systems 13, which include a hydraulic pump 34, hydraulic channels, a tank and necessary control means, such as valves and the like. Further, one or more hydraulic actuators may be connected to the hydraulic system 13. The hydraulic system 13 may be a drilling hydraulic system, to which actuators 15 necessary for moving the drilling booms 3a, 3b, as well as the rock drilling machine 6 are connected. The rock drilling rig 1 also comprises one or more control units C arranged to control the systems of the rock drilling rig 1. The control unit C may be a computer or a corresponding control device comprising a processor, a programmable logic or any other control device suitable for the purpose, to which it is possible to set at least one control strategy, according to which it carries out controlling independently or in cooperation with the operator.

At a drilling site P, one or more boreholes are drilled with the rock drilling rig 1. When the tasks determined for the drilling site P have been completed, the rock drilling rig 1 is transfer-driven from the drilling site P to a new drilling site or somewhere else, for instance to be serviced. In large mines, there may also be other needs to drive the rock drilling rig 1 along long downward-sloping drive ramps. The rock drilling rig 1 is provided with drive equipment 16 which does not include a combustion engine at all, i.e. it is combustion-engine-free. Instead, the drive equipment 16 includes one or more electric motors M, which generate the power required in the transfer drive. The electric motor M may be connected to a gearbox 17, from which rotating power is transmitted through shafts or corresponding transmission members 18 to one or more wheels 19. The energy required for transfer drive may be charged in an energy storage B, which may be a battery or a battery package, for instance. The drive equipment 16 may additionally include one or more control devices S and one or more brake resistors 20. The drive equipment 16 thus comprises a plurality of electric components K, which affect the transfer drive. Further, the rock drilling rig 1 may be provided with a liquid cooling system 21, by which it is possible to cool the electric components K included in the drive equipment 16.

Figure 2:
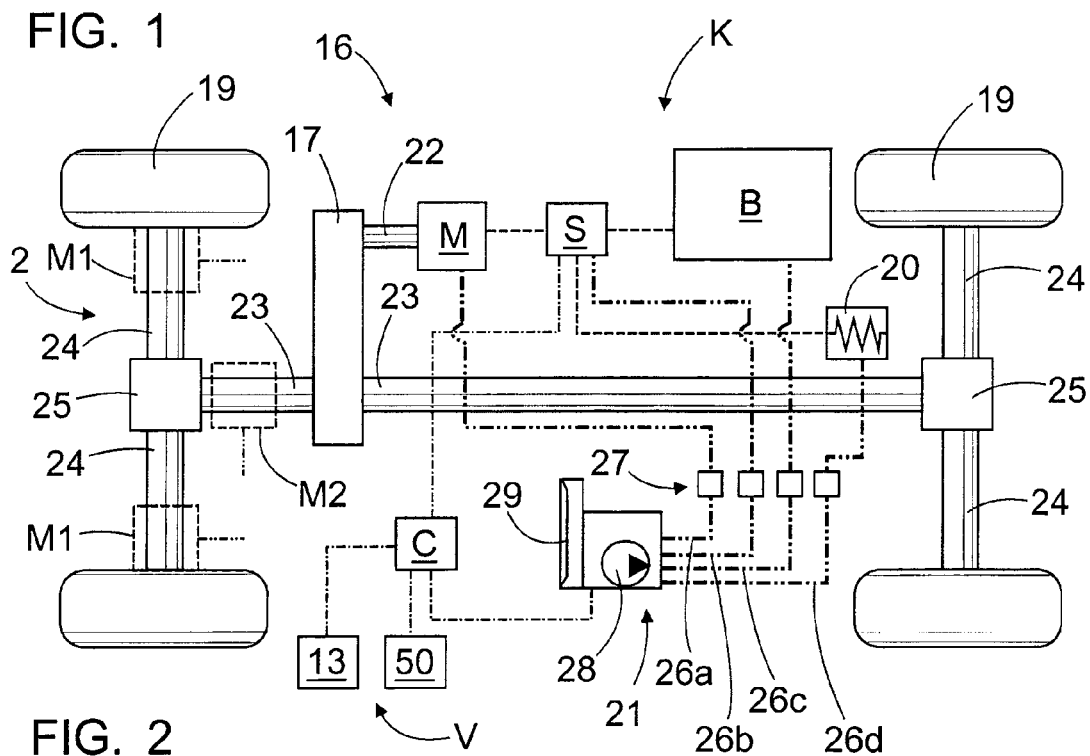
FIG. 2 shows schematically drive equipment with an electric drive motor connected to the traction wheels by means of anti-slip mechanical drive transmission.

FIG. 2 illustrates drive equipment 16 and an arrangement for converting kinetic energy into electric energy during deceleration in downhill driving. In the drive equipment 16, the electric motor M may be connected through an anti-slip transmission path 22 directly to the gearbox 17, which may include one, two or more gears in the driving direction and correspondingly in the reverse direction. The rotating torque may be transmitted from the gearbox 17 to wheel shafts 24 by means of shafts 23. Between the shafts 23 and 24, there may be angle drive 25 or the like. In that case, between the wheels 19 and the electric motor M there is mechanical anti-slip transmission. The electric motor M may also be used for decelerating, in which case it serves as a generator and converts kinetic energy of the carrier 2 into electric energy when the rock drilling rig is driven down the drive ramps in the mine. Generated electric energy may be charged in an energy storage B and thus recovered. Surplus electric energy which cannot be utilized may be converted into thermal energy in the brake resistor 20. The drive equipment 16 further includes a control device S, which may comprise a frequency converter, by which the rotation of the electric motor M can be controlled steplessly both during the drive and during the deceleration. The control device S may further comprise other necessary electric control devices for controlling electric currents in the electric driving system. The control device S may comprise, for instance, control means for connecting the energy storage B and the brake resistor 20 to the electric driving system. The operation of the control device S is controlled by a control unit C.

In this application, a "frequency converter" refers to a control member by which the rotation speed of the electric drive motor can be controlled in a stepless manner. The frequency converter may be an inverter or it may be a DC/AC converter, which controls the running of the electric motor.

FIG. 2 shows, denoted with broken lines, yet another alternative application, in which the electric drive motor is connected in an anti-slip manner directly to the transmission members. In connection with the shaft 24 on the left, there are wheel-specific electric hub motors M1, in connection with which there may be a required gearbox. Further, the rotating torque may be provided to the shaft 24 by means of one common electric drive motor M2.

The control unit C may control not only the electric driving system but also the operation of one or more pressure medium systems V. The pressure medium systems V may include a hydraulic system 13 and a compressed air system 50. The control unit C may control pumps, control members and actuators of these systems. Further, the control system C comprises a monitoring system monitoring the electric energy generated in the electric driving system, the consumption of electric energy as well as the charge level of the energy storage and its capacity to receive energy. On the basis of the monitoring, the control unit C can control the charging of the energy storage B and use the pressure medium systems V for increasing the consumption of electricity during downhill driving.

It further appears from FIG. 2 that the control unit C may also control the operation of the liquid cooling system 21. The liquid cooling system 21 may comprise a plurality of cooling circuits 26a to 26d, to each of which one or more electric components K of the drive transmission are connected. The cooling circuits 26 may be provided with one or more valves or a corresponding control member 27, by which it is possible to affect the liquid flow in the cooling circuit 26. The control unit C may control these control members 27 such that the cooling in accordance with the control strategy will be realized. It is further possible that a pump 28 of the liquid cooling system 21 is controlled, whereby the flow of the cooling liquid may be increased or reduced in the system. Further, the liquid cooling system 21 comprises at least one cooling unit 29, with which heat is transferred away from the cooling liquid, i.e. it is cooled. The cooling unit 29 may comprise a radiator of a conventional type and a blower for boosting the cooling. Alternatively, the cooling unit 29 may comprise a heat exchanger, by which heat is transferred from the cooling liquid into another liquid, such as that of the hydraulic system. Furthermore, it is feasible that the cooling unit 29 comprises a heat pump having a compressor with which heat can be transferred from the cooling liquid into another liquid or to the outdoor air. The control unit C may also control the operation of the cooling unit 29 such that the temperature of the cooling liquid can be affected. When necessary, it is possible to pre-cool the cooling liquid.

Figure 3:
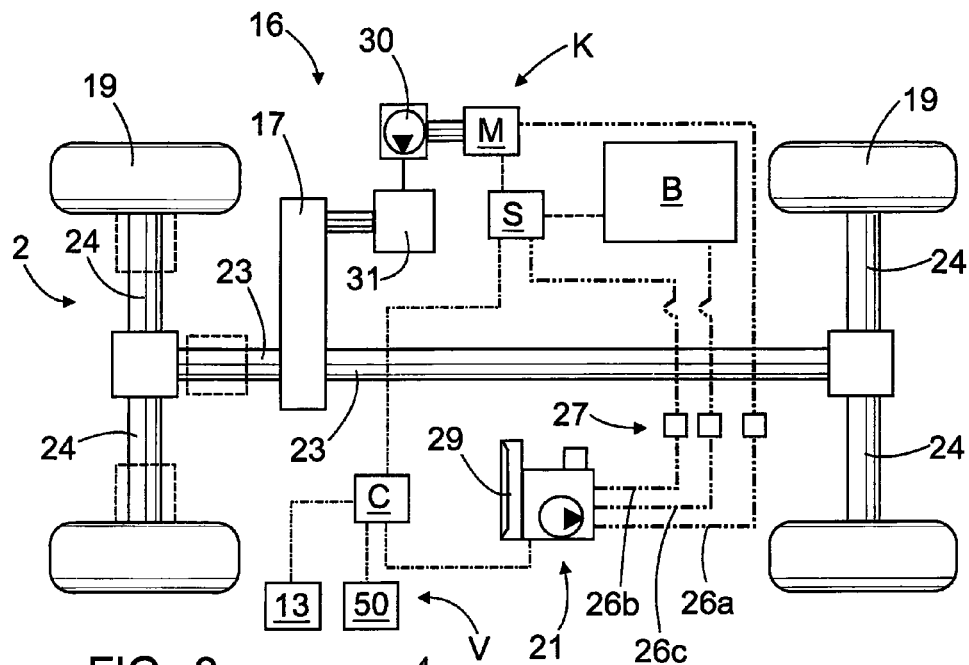
FIG. 3 shows schematically second drive equipment, in which an electric motor runs hydraulic drive transmission.

FIG. 3 shows an alternative application of the drive equipment 16, where the electric motor M is arranged to run a hydraulic pump 30, and the generated hydraulic power drives a hydraulic motor 31 that is connected to the gearbox 17. Thus, hydraulic drive transmission is concerned. The electric motor M included in the drive equipment can be used as a brake in downhill driving. Then, the hydraulic pressure generated by the hydraulic pump 30 runs the electric motor, which is connected to serve as a generator for the duration of downhill driving. Thus, the electric motor M generates electric energy, with which the energy storage can be charged. Surplus electric energy can be consumed by turning on electric-driven systems of the rock drilling rig, particularly the hydraulic system 13 and the compressed air system 50. FIG. 3 further shows in broken lines hydraulic hub motors H1 alternative to the hydraulic motor 31 and the gearbox, and a hydraulic motor H2 driving the shaft 24.

Figure 4:
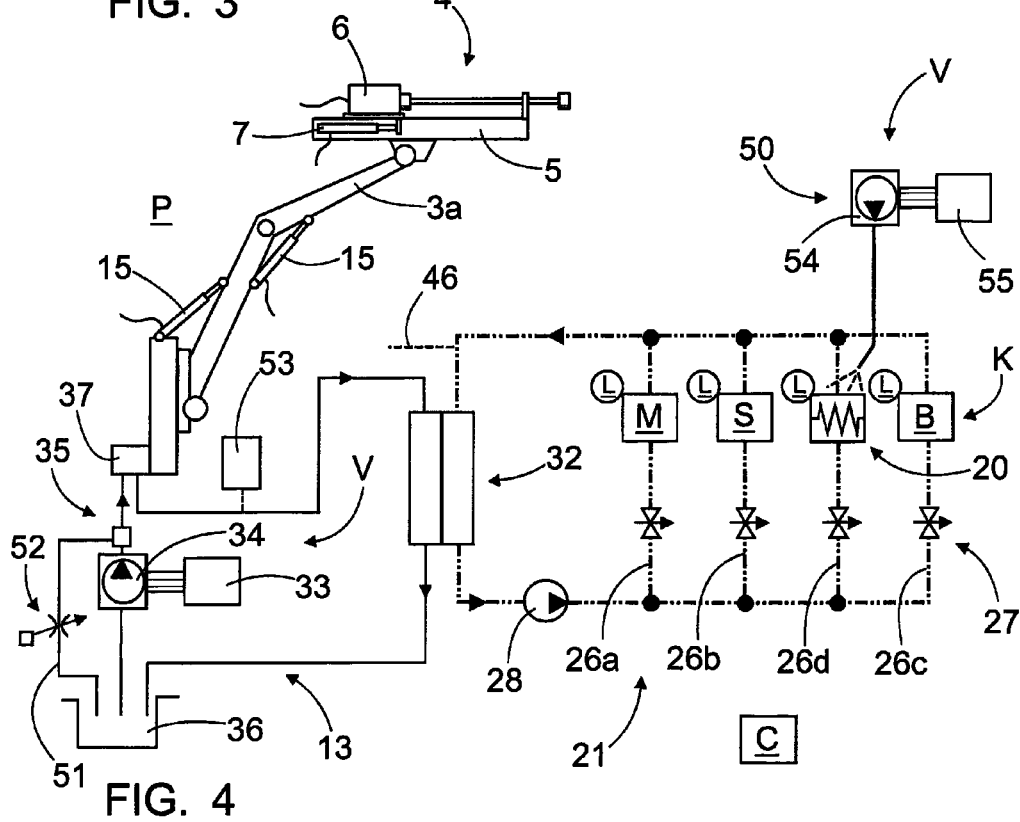
FIG. 4 shows schematically some pressure medium systems and a liquid cooling system.

FIG. 4 illustrates the pressure medium systems V and the cooling system of the rock drilling rig 1. The drilling hydraulic system 13 may comprise a motor 33, a pump 34, channels 35, a tank 36 and control means 37 for guiding hydraulic fluid to the actuators 15 of the boom 3a, to the feed device 7 and to the rock drilling machine 6 that are connected to the system. Further, the hydraulic system 13 may comprise a hydraulic circuit 51, which can be turned on by the control unit C when it is desirable to increase power consumption in the hydraulic system 13. The hydraulic circuit 51 may comprise one or more hydraulic components 52 which cause pressure loss and which can be controlled by the control unit C. The component 52 may be, for example, a throttle, a valve, such as a flow control valve, a hydraulic motor or another hydraulic actuator. Thus, to increase the consumption of hydraulic power, the control unit C may use one or more drilling actuators or another actuator, or it may direct hydraulic pressure against the throttle or the like component 52. Further, it is feasible to store hydraulic energy in a pressure accumulator 53.

Furthermore, the compressed air system 50 may be started, whereby an electric motor 55 driving a compressor 54 consumes surplus electric energy generated in the electric driving system. An air jet produced by the compressor 54 may be used for cooling the brake resistor 26 or another component K of the drive equipment.

FIG. 4 further illustrates that between the liquid cooling system 21 and the hydraulic system 13, there may be a heat exchanger 32, which allows heat to be transferred between the systems. Heat load may thus be balanced between the two liquid systems. The figure further shows a strong simplification of an embodiment where the cooling system 21 is connected by a connection 46 to the hydraulic system 13, whereby it is possible to use hydraulic fluid as a cooling liquid.

FIG. 4 also shows that the temperature of the electric components K of the drive equipment 16 may be monitored by means of temperature sensors L, sensor data of which may be transmitted to the control unit C for controlling the cooling system 21.

Figure 5:
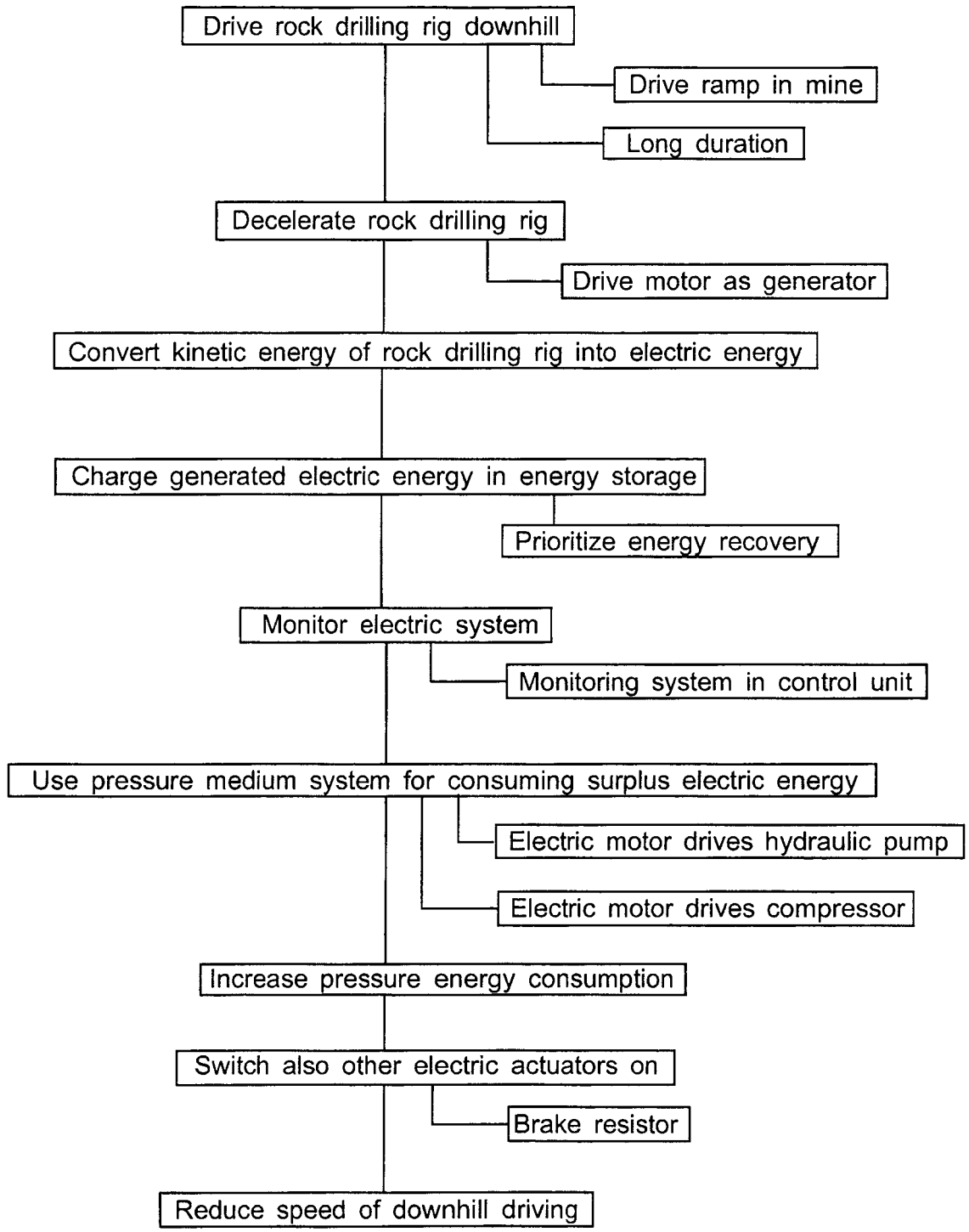
FIG. 5 shows schematically some aspects related to controlling downhill driving.

FIG. 5 shows a greatly simplified diagram of the operation of the drive equipment, electric driving system and pressure medium system during downhill driving. Aspects shown in the figures were presented in connection with the explanation of other figures and also at the beginning of the description where various embodiments were reported.

Although the drive equipment of the rock drilling rig is completely without a combustion engine, the carrier of the rock drilling rig may have a reserve power unit which may comprise a combustion engine. This combustion engine drives a generator for producing electric energy. The reserve power unit is not, however, included in the drive equipment, and it is only intended for use in special situations, for instance when the battery is flat or damaged.

In some cases, features disclosed in this application may be used as such, irrespective of other features. On the other hand, features disclosed in this application may, if required, be combined to form various combinations.

The drawings and the related description are only intended to illustrate the idea of the invention. Details of the invention may vary within the scope of the claims.

The invention claimed is:

1. A rock drilling rig, comprising:
   a movable carrier;
   combustion-engine-free drive equipment for performing a transfer drive of the rock drilling rig, the drive equipment including at least one electric drive motor and power transmission members between the at least one drive motor and at least one traction wheel;
   an electric system including at least one energy storage in which electric energy used in the transfer drive can be charged;
   at least one pressure medium system in which pressure and flow of a pressure medium is generated with at least one pump, which is driven by at least one electric motor connected to the electric system;
   at least one boom movable relative to the carrier and provided with a rock drilling machine;
   at least one control unit including at least one control strategy for controlling the systems; and
   wherein the at least one drive motor serves as a generator and a primary brake in long-term downhill driving, and wherein the at least one control unit monitors the electric system and controls the electric energy generated in downhill driving to charge the at least one energy storage, the at least one control unit comprising a control strategy according to which it turns at least one pressure medium system on in response to the electric system being insufficient to consume the surplus electric energy generated in the downhill driving, whereby the electric energy consumption can be intentionally increased by means of the pressure medium system, and the at least one control unit comprises a control strategy according to which the at least one control unit controls the speed of downhill driving, taking into account the capability of the systems to consume the electric energy generated in deceleration.

2. The rock drilling rig of claim 1, further comprising a drilling hydraulic system and wherein the at least one control unit comprises a control strategy according to which it turns the drilling hydraulic system on to consume surplus electric energy during downhill driving.

3. The rock drilling rig of claim 1, wherein the at least one pressure medium system is provided with at least one hydraulic component causing pressure loss and wherein the at least one control unit is arranged to turn said at least one hydraulic component on during downhill driving, whereby the energy consumption of the at least one pressure medium system increases.

4. The rock drilling rig of claim 1, further comprising at least one compressed air system, and wherein the at least one control unit comprises a control strategy according to which the at least one control unit turns the at least one compressed air system on during downhill driving.

5. The rock drilling rig of claim 1, wherein the at least one control unit is arranged to control, during downhill driving, the pressure medium produced by the at least one pressure medium system to cool at least one electric component included in the electric system.

6. The rock drilling rig of claim 1, further comprising at least one liquid cooling system to cool at least one electric component included in the electric system, wherein the at least one control unit turns the at least one liquid cooling system on for downhill driving.

7. The rock drilling rig of claim 6, wherein the at least one pressure medium system is arranged to cool cooling liquid of the at least one liquid cooling system during downhill driving.

8. The rock drilling rig of claim 1, wherein the at least one control unit is arranged to turn on at least one pressure medium-driven actuator connected to the at least one pressure medium system during downhill driving to increase the energy consumption, whereby the respective actuator is turned on without any need for any basic operation provided by it.

9. The rock drilling rig of claim 1, wherein the electric system includes at least one electric brake resistor for converting surplus electric energy generated in downhill driving into heat.

10. A method for downhill drive of a rock drilling rig, comprising the steps of:
    transfer-driving the rock drilling rig with electric drive equipment along a downward-sloping drive surface, whereby potential energy bound to the rock drilling rig is released as kinetic energy;
    decelerating the motion of the rock drilling rig during long-term downhill driving primarily by at least one electric drive motor included in drive equipment the at least one electric drive motor being connected to serve as a generator for the duration of the downhill driving, whereby kinetic energy of the rock drilling rig is converted into electric energy;
    charging the electric energy generated during the downhill driving in at least one electric storage included in an electric system of the rock drilling rig;
    converting electric energy generated during the downhill driving into pressure energy in response to a need to consume surplus energy; and
    maximizing the driving speed of the rock drilling rig during downhill driving, taking into account the system's greatest electricity consumption that is aimed at.

11. The method of claim 10, further comprising the step of increasing the need for pressure energy during downhill driving to increase energy consumption.

12. The method of claim 10, further comprising the step of turning the drilling hydraulics on to increase energy consumption.

13. The method of claim 10, further comprising the step of turning on a plurality of systems related to the basic operations of the rock drilling rig simultaneously without any need for the basic operations or effect of these systems during downhill driving.

14. A method of claim 10, further comprising the step of converting surplus electric energy remaining after charging the at least one electric storage into heat in a brake resistor.

15. The method of claim 14, further comprising the step of converting surplus electric energy remaining after charging the at least one electric storage into heat in a brake resistor by allowing, during downhill driving, momentary overload of the brake resistor, compared with its rated load.

* * * * *